Aug. 4, 1925.
H. C. LORD
1,548,050
JOINT
Filed March 22, 1923
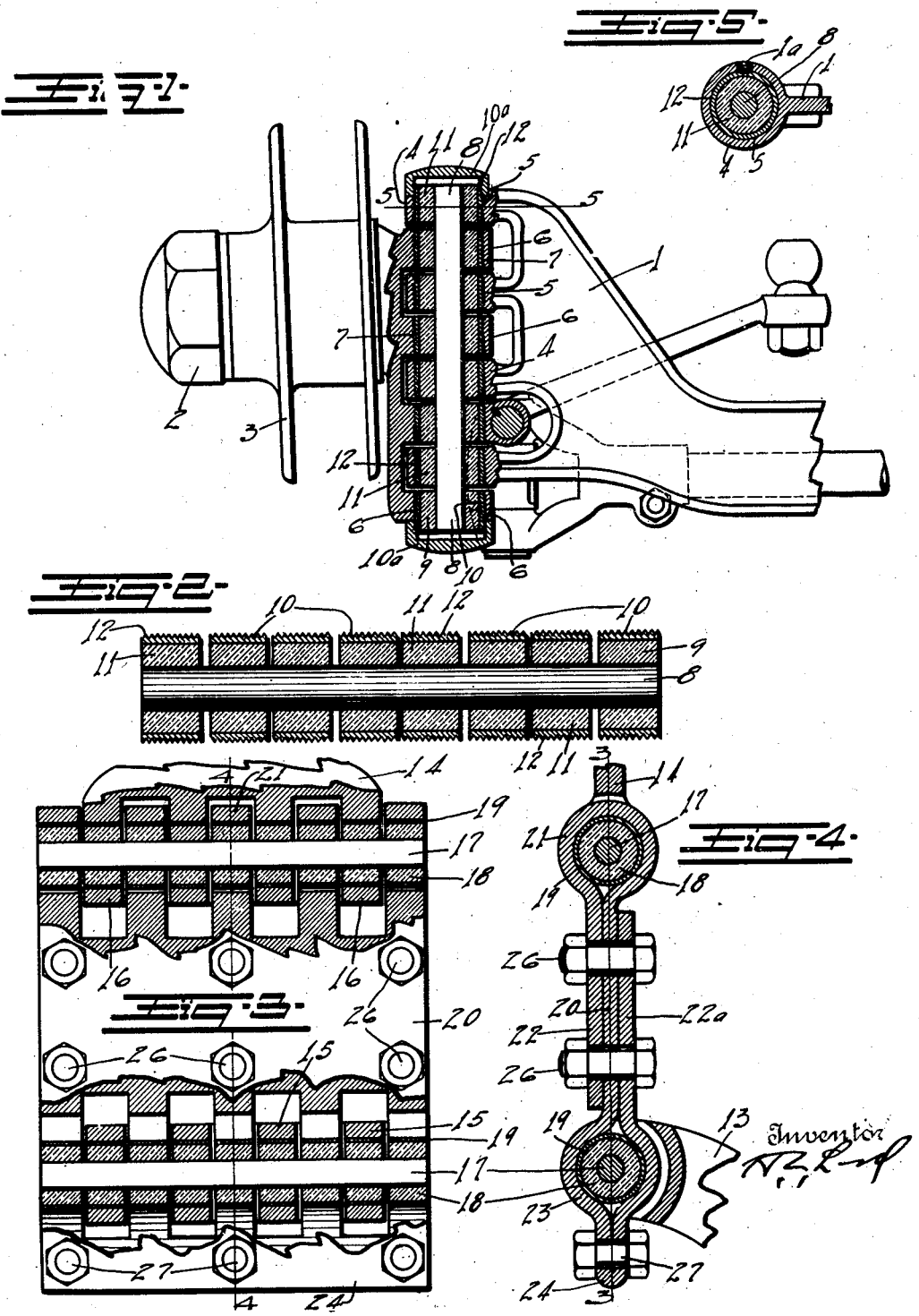

Patented Aug. 4, 1925.

1,548,050

UNITED STATES PATENT OFFICE.

HUGH C. LORD, OF ERIE, PENNSYLVANIA.

JOINT.

Application filed March 22, 1923. Serial No. 626,873.

*To all whom it may concern:*

Be it known that I, HUGH C. LORD, a citizen of the United States, residing at Erie, in the county of Erie and State of Pennsylvania, have invented new and useful Improvements in Joints, of which the following is a specification.

This invention is designed to improve oscillating joints using a rubber insert which by its distortion or stretch accommodates the movement of the joint. With such devices it is often desirable in order to provide for the wall or rubber to use a comparatively small pin and where this is done in order to sustain the load to which the joint is subjected it is desirable to support the pin at a number of places so that the tendency to bend the pin is largely removed. The invention further contemplates a vertical joint. Where inserts of rubber are used in a vertical joint it is desirable to space the units of the joint so that when the joint is subjected to the load the units will be properly spaced. The invention also contemplates a construction which facilitates the assembling of a joint having rubber inserts with a central floating pin. The invention further contemplates the connecting up of joints of this general type.

The invention is illustrated in the accompanying drawings as follows:—

Fig. 1 shows a front elevation, partly in section, of a knuckle joint of an automobile.

Fig. 2 an enlarged section of the joint element.

Fig. 3 an end elevation of a shackle or joint, the joint being partly in section.

Fig. 4 a section on the line 4—4 in Fig. 3.

Fig. 5 a section on the line 5—5 in Fig. 1.

1 marks the axle, 2 the knuckle, and 3 the hub of a wheel. The axle has a plurality of projections 4 through which extend the screw-threaded openings 5 and the knuckle has a series of projections 6 through which extend the screw-threaded openings 7. The projections 4 and 6 are arranged so that they may be placed alternately bringing the openings into register. A pivot pin 8 extends through the opening. Rubber members 9 are bonded by surface bonding, accomplished preferably during vulcanization, on the pivot pin 8 and are within the openings 7. Steel shells 10 are secured to the outer surface of the rubber by bonding preferably during vulcanization. Similar rubber members 11 are bonded to the pin 8 in the openings 4 and these are also bonded to the outer shells 12. The shells 10 and 12 are screw-threaded so that when the projections 4 and 6 are placed so as to bring the openings 5 and 7 into register the joint element made up of the pin 8 and the series of rubber members and shells can be screwed into the opening and the joint thus assembled. Set screws 1ª extend through each projection so as to lock the shells 10 and 12 against turning in the projections after the element has been screwed to place. I prefer to have the end shells at the ends of the joint protrude and to screw nuts 10ª on these protruding ends. These nuts may be made to act as lock washers and when provided with caps serve as a cover and finish for the end of the joint.

When the weight is put on this joint there is a slight movement endwise of the element due to the elasticity of the rubber. Thus the weight on the projections 4 tends to move the shells 12 downwardly relatively to the pin 8 and also to exert downward pressure on the pin 8 which is communicated to the members 9 and the members 9 yielding under this pressure permit a slight movement of the pin 8 downwardly relative to the projections 6. In order to prevent a movement which would bring the metal parts into contact and still have all the parts reasonably close together it is desirable to vary the spacing between the units as clearly shown in Fig. 2. Thus the space at the top of the shells 10 is greater than at the bottom of these shells so that the downward movement of the shells 12 under the load will equalize the spacing.

In Figs. 3 and 4 I have shown an improved joint connection or hanger in connection with the multiple unit joint. In this there is a frame member 13 and spring connection 14. One spring member has the projections 15 and to the other spring member the projections 16. Pivot pins 17 extend through the projections, these projections having openings larger than the pins. A plurality of rubber members 18 are secured to the pins 17 by surface bonding and to a series of shells 19, the shells being secured in the openings in the projections 15 and 16. A connecting member 20 has eyes 21 and 23 at its ends which are formed integrally with the connecting member 20 by bending the connecting member 20 in the form of a strap in opposite directions. The eye 21 has an extension 22 which extends along one side of the connecting strap 20 and the eye 23 has an extension strap 22ª which extends along the connecting member 20. These parts are normally somewhat open and are brought together and secured by clamping bolts 26, the closing of the eyes by bringing these eyes together clamping these eyes on the shells of the joint units arranged in the eyes. To adapt this device to a plurality of units the strap member 20 is preferably notched or cut out at intervals so that the eyes are formed in projections which alternate with the projections 15 and 16. If preferred the eyes may be extended in a loop 24 through which a clamping bolt 27 extends. The whole connection, however, is formed by bending a single piece of sheet metal.

What I claim as new is:—

1. In a joint, the combination of a pivot member; two joint members, each having a plurality of projections alternating with the projection on the companion joint member, said projections having openings through which the pivot member extends; and rubber inserts locked between the pivot member and the walls of the openings, said inserts being locked to the pivot member and with the walls of the openings.

2. In a joint, the combination of a pivot member; two joint members, each having a plurality of projections alternating with the projection on the companion joint member, said projections having openings through which the pivot member extends; and rubber inserts locked between the pivot member and the walls of the openings, said inserts being locked to the pivot member and with the walls of the openings by surface bonding of the rubber.

3. In a joint, the combination of a pivot member; two joint members, each having a plurality of projections alternating with the projection on the companion joint member, said projections having openings through which the pivot member extends; rubber inserts locked to the pivot pin and to rigid shells on their outer periphery; and means for securing the shells in the openings in the joint members.

4. In a joint, the combination of a pivot member; two joint members, each having a plurality of projections alternating with the projections of the companion member, said projections having screw-threaded openings therethrough through which the pivot member extends; rubber inserts locked with the pivot member; and screw threaded shells secured to the rubber inserts and screwed into the screw-threaded openings.

5. In a joint, the combination of a pivot member; two joint members, each having a plurality of projections alternating with the projections of the companion member, said projections having screw-threaded openings therethrough through which the pivot member extends; rubber inserts locked with the pivot member; screw threaded shells secured to the rubber inserts and screwed into the screw-threaded openings; and means for locking the shells against turning in the openings.

6. In a joint, the combination of a pivot member; two joint members, each having a plurality of projections alternating with the projections of the companion member, said projections having screw-threaded openings therethrough through which the pivot member extends; rubber inserts locked with the pivot member; screw threaded shells secured to the rubber inserts and screwed into the screw-threaded openings; and means for locking the shells against turning in the openings comprising a set screw through each projection.

7. In a joint, the combination of a pivot member; two joint members having aligned openings therethrough through which the pivot member extends; and rubber inserts locked to the pivot member and the walls of the openings, said inserts and joint members forming joint units, the space between said joint units varying initially.

8. In a joint, the combination of a pivot member; two joint members having aligned openings therethrough through which the pivot member extends; rubber inserts locked to the pivot member and the walls of the openings; and rigid shells secured to the outer surfaces of the rubber inserts and to the walls of the openings, the inserts, shells and joint members forming joint units, the spacing between the shells varying initially.

9. In a knuckle joint for automobiles, the combination of an axle; a knuckle, said axle and knuckle having openings therethrough in alinement; a pivot member extending through said openings; and rubber inserts locked to said pin and to the walls of said openings.

10. In a knuckle joint for automobiles, the combination of an axle; a knuckle, the axle and knuckle having joint members, a joint member of one being between joint members of the other, said joint members having aligned openings therethrough; a pivot member extending through said openings; and rubber inserts locked to the pivot member and to the walls of said openings, the spacing between said joint members being varied initially.

11. In a knuckle joint for automobiles, the combination of an axle; a knuckle, said axle and knuckle having joint members with screw-threaded openings in alinement; a pivot member extending through the opening; rubber inserts locked to the pivot member; and screw-threaded shells secured to the rubber inserts and screwed into the screw-threaded openings.

12. In a knuckle joint for automobiles, the combination of an axle; a knuckle, the axle and knuckle having joint members, a joint member of one being between the joint members of the other, said joint members having aligned openings therethrough; a pivot member extending through said openings; rubber inserts locked to the pivot member; and screw-threaded shells secured to the rubber inserts and screwed into the screw-threaded openings.

13. In a knuckle joint for automobiles, the combination of an axle; a knuckle, the axle and knuckle having joint members, a joint member of one being between the joint members of the other, said joint members having aligned openings therethrough; a pivot member extending through said openings; rubber inserts locked to the pivot member; and screw-threaded shells secured to the rubber inserts and screwed into the screw-threaded openings, the spacing between the shells being varied initially.

14. In a knuckle joint for automobiles, the combination of an axle; a knuckle, the axle and knuckle having joint members, a joint member of one being between the joint members of the other, said joint members having aligned openings therethrough; a pivot member extending through said openings; rubber inserts locked to the pivot member; screw-threaded shells secured to the rubber inserts and screwed into the screw-threaded openings; and means for locking the shells against turning in the joint members.

15. In a joint, the combination of a plurality of joint sleeves having screw-threaded openings therein; screw-threaded shells screwed into said sleeves and having their ends protruding; a pivot member within said shells; rubber inserts secured to the pivot member and the shells; and nuts arranged on the protruding ends of the shells.

16. In a joint, the combination of a plurality of joint sleeves having screw-threaded openings therein; screw-threaded shells screwed into said sleeves and having their ends protruding; a pivot member within said shells; rubber inserts secured to the pivot member and the shells; and nuts arranged on the protruding ends of the shells, said nuts being provided with caps.

17. In a joint, the combination of two joint members having projections with screw-threaded openings in alinement, one of the members having a plurality of such projections; screw threaded shells screwed into said projections, the end shells protruding from the projections; a pivot member extending through the shells; rubber inserts secured to the pivot member and to the shells; and nuts on the protruding ends of the shells.

18. In a joint, the combination of two joint members having projections with screw-threaded openings in alinement, one of the members having a plurality of such projections; screw threaded shells screwed into said projections, the end shells protruding from the projections; a pivot member extending through the shells; rubber inserts secured to the pivot member and to the shells; and nuts on the protruding ends of the shells, said nuts being provided with caps.

In testimony whereof I have hereunto set my hand.

HUGH C. LORD.